(12) United States Patent
Ou et al.

(10) Patent No.: US 12,465,957 B2
(45) Date of Patent: Nov. 11, 2025

(54) MULTI-AXIS VARIABLE-SPEED HOT WASHING MODULE AND HOT WASHING METHOD THEREOF

(71) Applicant: ZHEJIANG BORETECH ENVIRONMENTAL ENGINEERING CO., LTD., Zhejiang (CN)

(72) Inventors: Zhewen Ou, Zhejiang (CN); Hui Dong, Zhejiang (CN)

(73) Assignee: ZHEJIANG BORETECH ENVIRONMENTAL ENGINEERING CO. LTD., Zhejiang (CN)

( * ) Notice: Subject to any disclaimer, the term of this patent is extended or adjusted under 35 U.S.C. 154(b) by 0 days.

(21) Appl. No.: 18/273,259

(22) PCT Filed: Dec. 21, 2022

(86) PCT No.: PCT/CN2022/140667
§ 371 (c)(1),
(2) Date: Jul. 19, 2023

(87) PCT Pub. No.: WO2023/116760
PCT Pub. Date: Jun. 29, 2023

(65) Prior Publication Data
US 2024/0116088 A1    Apr. 11, 2024

(30) Foreign Application Priority Data
Dec. 24, 2021  (CN) .......................... 202111595969.4

(51) Int. Cl.
*B08B 3/10*   (2006.01)
*B08B 1/16*   (2024.01)
(Continued)

(52) U.S. Cl.
CPC .............. *B08B 3/104* (2013.01); *B08B 1/165* (2024.01); *B08B 1/20* (2024.01); *B08B 7/04* (2013.01);
(Continued)

(58) Field of Classification Search
CPC ................ B29B 17/0412; B29B 17/02; B29B 2017/0021; B29B 2017/0203;
(Continued)

(56) References Cited

U.S. PATENT DOCUMENTS 4,073,661 A * 2/1978 Buzga ....................... B03B 5/54
134/19
4,830,188 A * 5/1989 Hannigan ............... B03B 9/061
209/172.5
(Continued)

FOREIGN PATENT DOCUMENTS

CN    103802232 A    5/2014
CN    104959343 A    10/2015
(Continued)

OTHER PUBLICATIONS

European Supplementary Search Report mailed Oct. 15, 2024 in counterpart European application 222910072.2, 12 pages in English.
(Continued)

*Primary Examiner* — Erin F Bergner
(74) *Attorney, Agent, or Firm* — Juan Carlos A. Marquez; Marquez IP Law Office, PLLC

(57) ABSTRACT

A multi-axis variable-speed hot washing module and a hot washing method thereof are provided. The multi-axis variable-speed hot washing module includes a storage assembly, a dehydration assembly, and one or more multi-axis variable-speed hot washing machines, where the multi-axis variable-speed hot washing machine is connected to the
(Continued)

storage assembly and the dehydration assembly. Batches of materials are stored in the storage assembly. When cleaning, the materials are put from the storage assembly into one or more multi-axis variable-speed hot washing machines, and medicinal water is added. The multi-axis variable-speed hot washing machine replaces functions of a hot washing machine, a screw, and a friction machine, and has relatively large mechanical friction on the materials during cleaning. The materials after being hot washed by the multi-axis variable-speed hot washing machine are transported to the dehydration assembly for dehydration, so as to implement separation of cleaning water and the materials.

14 Claims, 9 Drawing Sheets

(51) Int. Cl.
*B08B 1/20* (2024.01)
*B08B 7/04* (2006.01)
*B29B 17/02* (2006.01)
*B29B 17/00* (2006.01)

(52) U.S. Cl.
CPC ........ *B29B 17/02* (2013.01); *B08B 2203/007* (2013.01); *B29B 2017/0015* (2013.01); *B29B 2017/0289* (2013.01)

(58) Field of Classification Search
CPC .... B29B 2017/0289; B29B 2017/0293; B29B 2017/0488; B29B 17/04; B29B 2017/0015; B29B 2017/0217; B29B 2017/0424; B29B 2017/0286; B29B 17/00; B08B 3/08; B08B 5/02; B08B 5/04; B08B 7/02; B08B 7/04; B08B 2220/01; B08B 9/083; B08B 3/104; B08B 1/165; B08B 1/20; B08B 2203/007; B08B 3/10; B08B 3/102; B32B 43/006; B32B 2439/60; B32B 2439/70; B32B 2519/00; B32B 7/12; B32B 27/08; B32B 27/32; B32B 27/36; C11D 1/008; C11D 1/123; C11D 1/29; C11D 1/72; C11D 3/044; C11D 3/43; C11D 2111/18; C11D 3/2093; C11D 3/3445; B29K 2023/0633; B29K 2023/065; B29K 2023/06; B29L 2009/00; B29L 2031/7158; Y02W 30/62; Y02W 30/20; Y02W 30/52; F26B 25/002; F26B 2200/04

See application file for complete search history.

(56) References Cited

U.S. PATENT DOCUMENTS

| | | | |
|---|---|---|---|
| 5,137,042 | A | 8/1992 | Jou et al. |
| 5,443,652 | A * | 8/1995 | Scarola ................... B29B 17/02 241/DIG. 38 |
| 5,894,996 | A * | 4/1999 | Williams ................ B03B 9/061 209/172.5 |
| 2002/0033550 | A1 | 3/2002 | Suebara |
| 2010/0258552 | A1* | 10/2010 | Zhao ...................... H05B 3/286 156/193 |
| 2019/0351427 | A1* | 11/2019 | Previero ................. B29B 17/02 |
| 2024/0075504 | A1* | 3/2024 | Ou .......................... B29B 17/02 |

FOREIGN PATENT DOCUMENTS

| | | |
|---|---|---|
| CN | 107008686 A | 8/2017 |
| CN | 107627486 A | 1/2018 |
| CN | 111957655 A | 11/2020 |
| CN | 213674977 U | 7/2021 |
| CN | 114434683 A | 5/2022 |
| KR | 1020160039828 A | 4/2016 |
| KR | 101941462 B1 | 1/2019 |
| TW | 201032979 A | 9/2010 |
| WO | 2018115104 A1 | 6/2018 |

OTHER PUBLICATIONS

PCT International Search Report mailed Feb. 25, 2023 in counterpart PCT application PCT/CN2022/140667, 3 pages in English.

* cited by examiner

MULTI-AXIS VARIABLE-SPEED HOT WASHING MODULE AND HOT WASHING METHOD THEREOF

CROSS-REFERENCE TO RELATED APPLICATION

This application is a national stage application filed under 35 U.S.C 371 of International Application No. PCT/CN2022/140667 filed Dec. 21, 2022, which claims priority to China Patent Application 202111595969.4 filed Dec. 24, 2021. The disclosures of the above applications are incorporated herein by reference in their entireties.

FIELD OF THE INVENTION

The present invention relates to the field of plastic recycling and cleaning technologies, and in particular, to a multi-axis variable-speed hot washing module and a hot washing method thereof.

BACKGROUND OF THE INVENTION

In the related art, in a cleaning process of plastic bottle flakes, plastic bottle flakes processed by a crushing unit separately enter into three hot washing machines through a hot washing feeding screw and a hot washing distribution screw for stirring and hot washing. Each hot washing machine is a cylinder with a smooth inner wall and a single cleaning blade shaft is arranged in an inner cavity. In a hot washing process, an appropriate amount of medicinal water is added into the hot washing machine. After being stirred and cleaned by high-temperature medicinal water for a specific period of time, dirt and impurities on the bottle flakes are removed and paper labels or adhesives on the bottle flakes are softened.

After hot washing is completed, materials enter a feeding screw conveyor from a discharge port at a bottom part of the hot washing machine, and are evenly transported to a friction machine by the feeding screw conveyor. A high-speed rotating rotor in the friction machine drives the materials to rotate, so that the bottle flakes rubs against a blade and the inner wall to scrape off the labels or adhesives on the bottle flakes. After friction of the bottle flakes is completed, the bottle flakes are transported to a dehydrator, and then enter a next process after dehydration and drying.

The existing technical solution has the following defects: because mechanical friction of the design is relatively small during hot washing, and the impurities are difficult to be fully cleaned in the hot washing process; there is a dead angle at a bottom part of the screw conveyor, materials are prone to be accumulated, which has a relatively great impact on a next batch of materials; and a quantity of devices is large, a volume and space occupied are large, and a device cost is high.

SUMMARY OF THE INVENTION

For the deficiencies in the related art, an objective of the present invention is to provide a multi-axis variable-speed hot washing module and a hot washing method thereof. A hot washing machine, a screw, and a friction machine are integrated into a multi-axis variable-speed hot washing machine. Mechanical friction of the multi-axis variable-speed hot washing machine is relatively large, thereby greatly improving cleaning effect, reducing investment in devices and land occupation, and simultaneously improving efficiency of hot washing. An entire process is rationalized, compacted, and simplified.

The objective of the present invention may be achieved by the following technical solution.

A multi-axis variable-speed hot washing module includes a storage assembly and a dehydration assembly, and further includes one or more multi-axis variable-speed hot washing machines, where the multi-axis variable-speed hot washing machine is connected to the storage assembly and the dehydration assembly.

In a preferred example, the present invention may be further configured as the following. The multi-axis variable-speed hot washing machine includes a cleaning cavity, a variable-speed drive apparatus, and a rotation mechanism, the rotation mechanism is arranged in an inner cavity of the cleaning cavity and is in transmission connection with the variable-speed drive apparatus, at least two or more groups of rotation mechanisms are arranged, and the variable-speed drive apparatus is configured to adjust a rotation speed of the rotation mechanism.

In a preferred example, the present invention may be further configured as the following. a scraping mechanism configured to enhance a cleaning effect of squeeze and friction with cleaning materials is arranged on an inner wall of the cleaning cavity.

In a preferred example, the present invention may be further configured as the following. The scraping mechanism includes a plurality of protrusions fixed on the inner wall of the cleaning cavity.

In a preferred example, the present invention may be further configured as the following. three groups of rotation mechanisms are arranged, and each group of rotation mechanisms is equipped with one variable-speed drive apparatus.

In a preferred example, the present invention may be further configured as the following. three groups of rotation mechanisms are arranged, and the three groups of rotation mechanisms share one variable-speed drive apparatus.

In a preferred example, the present invention may be further configured as the following. The rotation mechanism includes a cleaning blade shaft and a plurality of blades, the plurality of blades are axially arranged on the cleaning blade shaft, and the cleaning blade shaft is in transmission connection with the variable-speed drive apparatus.

In a preferred example, the present invention may be further configured as the following. a connecting plate is fixed between each of the blades and the cleaning blade shaft.

In a preferred example, the present invention may be further configured as the following. each of the blades is arranged as a strip-shaped plate structure, each of the blades includes an anti-bending plate and an inclined plate, and the anti-bending plate and the inclined plate are integrally formed and are fixedly connected; and the anti-bending plate is horizontally arranged, and the inclined plate is obliquely arranged.

In a preferred example, the present invention may be further configured as the following. a reinforcing member is fixedly connected to the connecting plate, and one end of the inclined plate close to the connecting plate is fixed on the reinforcing member.

In a preferred example, the present invention may be further configured as the following. a heating mechanism configured to heat cleaning water is arranged inside the cleaning cavity.

In a preferred example, the present invention may be further configured as the following. a plurality of liners are arranged in the inner cavity of the cleaning cavity, and one end of each of the liners away from an inner wall of the cleaning cavity offsets toward a central axis of the cleaning cavity; and a hot washing sub-cavity is formed between two adjacent liners, and a plurality of hot washing sub-cavities are in communication with each other to form the inner cavity of the cleaning cavity.

In a preferred example, the present invention may be further configured as the following. The heating mechanism includes a plurality of heating rods, heat conduction oil is arranged in each of the liners, and the heating rods are mounted in the liners to heat the heat conduction oil.

In a preferred example, the present invention may be further configured as the following. An insulating layer is arranged on an outer wall of the cleaning cavity.

In a preferred example, the present invention may be further configured as the following. a drain valve in communication with inside of the liner is arranged at a bottom part of the cleaning cavity.

In a preferred example, the present invention may be further configured as the following. a plug valve in communication with inside of the cleaning cavity is arranged at a bottom part of the cleaning cavity.

In a preferred example, the present invention may be further configured as the following. The variable-speed drive apparatus includes a motor and a bearing seat assembly, the motor is in transmission connection with the bearing seat assembly through a belt, and the bearing seat assembly is in transmission connection with the cleaning blade shaft.

In a preferred example, the present invention may be further configured as the following. The motor is configured as a variable frequency motor.

In a preferred example, the present invention may be further configured as the following. The storage assembly includes a temporary storage bin, a first conveying apparatus, and a preparatory bin in communication with the temporary storage bin, the temporary storage bin is configured to store materials, the first conveying apparatus is configured to transport the materials in the temporary storage bin to the preparatory bin, the preparatory bin is configured to measure the materials and mix medicinal water and the materials, and the preparatory bin is in communication with the inner cavity of the cleaning cavity.

In a preferred example, the present invention may be further configured as the following. The preparatory bin includes an upper preparatory bin and a lower preparatory bin that are in communication with each other, a switch is arranged at a joint between the upper preparatory bin and the lower preparatory bin, and a meter configured to measure the materials is arranged in the upper preparatory bin; and the temporary storage bin is connected to the upper preparatory bin through the first conveying apparatus, and the lower preparatory bin is in communication with the inner cavity of the cleaning cavity through a water pump.

In a preferred example, the present invention may be further configured as the following. a stirrer is arranged in the lower preparatory bin, and a preheating apparatus is arranged on the lower preparatory bin.

In a preferred example, the present invention may be further configured as the following. The dehydration assembly includes a water shower machine, a dehydrator, and a second conveying apparatus, inside of the water shower machine is in communication with the inner cavity of the cleaning cavity, the water shower machine is connected to the dehydrator through the second conveying apparatus, and the inner cavity of the cleaning cavity is in communication with the inside of the water shower machine through a water pump.

In a preferred example, the present invention may be further configured as the following. The water shower machine is connected to the water groove configured to collect the discharged medicinal water.

In a preferred example, the present invention may be further configured as the following. The first conveying apparatus is configured as a first screw conveyor, one end of the first screw conveyor is connected to a bottom part of the temporary storage bin, and the other end of the first screw conveyor is connected to a top part of the preparatory bin.

In a preferred example, the present invention may be further configured as the following. The second conveying apparatus is configured as a second screw conveyor, one end of the second screw conveyor is connected to a buffer bin, the other end of the second screw conveyor is in communication with inside of the dehydrator, and the buffer bin is arranged at a bottom part of a discharge port of the water shower machine.

A hot washing method based on a multi-axis variable-speed hot washing module includes the following steps:

S1: material premixing, where dry materials are put from a temporary storage bin into a preparatory bin, and heated medicinal water is added into the preparatory bin to form high-temperature material mixed liquid;

S2: hot washing, where after the materials are fully mixed with the medicinal water, the high-temperature material mixed liquid is pumped into a multi-axis variable-speed hot washing machine through a water pump, and the multi-axis variable-speed hot washing machine performs timing low-speed soaking washing and timing high-speed friction washing on the materials; and S3: dehydration, where after the hot washing is completed, material mixed liquid in the multi-axis variable-speed hot washing machine is quickly pumped into a water shower machine through the water pump, the materials after preliminary dehydration by the water shower machine are sent into a buffer bin with a screw, the materials are sent into a dehydrator through screwing for dehydration, and a next process is entered after drying.

In a preferred example, the present invention may be further configured as the following. step S1 further includes the following substeps:

S1a: putting the dry materials from the temporary storage bin into an upper preparatory bin through screw conveying, and measuring a weight of added materials through a meter;

S1b: turning on a switch at a joint between the upper preparatory bin and a lower preparatory bin, pouring the materials into the lower preparatory bin, and simultaneously pumping the heated medicinal water into the lower preparatory bin through the water pump;

S1c: turning on a stirrer and a preheating apparatus, and mixing the materials and the medicinal water into the high-temperature material mixed liquid under stirring of the stirrer in the lower preparatory bin and heating of the preheating apparatus; and S1d: after the materials and the medicinal water are fully mixed, turning on a valve at a bottom part of the lower preparatory bin, and pumping the high-temperature material mixed liquid into the multi-axis variable-speed hot washing machine through the water pump.

In a preferred example, the present invention may be further configured as the following. An amount of the high-temperature material mixed liquid prepared by the upper preparatory bin and the lower preparatory bin once is an amount used for a single multi-axis variable-speed hot washing machine to perform cleaning once.

In a preferred example, the present invention may be further configured as the following. In step S1d, the upper preparatory bin and the lower preparatory bin simultaneously prepare a next batch of material mixed liquid, and sequentially pump the next batch of material mixed liquid into a next multi-axis variable-speed hot washing machine.

In a preferred example, the present invention may be further configured as the following. In step S3, the medicinal water discharged from the water shower machine and the dehydrator is collected into a corresponding water groove, and recycled after treatment.

In a preferred example, the present invention may be further configured as the following. In step S2:

the step of timing low-speed soaking washing includes: adjusting a variable-speed drive apparatus of the multi-axis variable-speed hot washing machine, so that the variable-speed drive apparatus drives a plurality of cleaning blade shafts to perform low-speed pre-soaking washing for 30 to 40 min at a rotation speed of 70 to 100 r/min; and the step of timing high-speed friction washing includes: adjusting the variable-speed drive apparatus of the multi-axis variable-speed hot washing machine again, so that the rotation speed of the plurality of cleaning blade shafts is increased to 800 to 1000 r/min to perform high-speed cleaning, which lasts for 30 to 40 min.

In summary, the present invention includes at least one of the following beneficial technical effects:

1. Batches of materials are stored in the storage assembly. When cleaning, the materials are put from the storage assembly into one or more multi-axis variable-speed hot washing machines, and medicinal water is added. The multi-axis variable-speed hot washing machine replaces a function of a hot washing machine, a screw, and a friction machine, and has a relatively large mechanical friction on the materials during cleaning, which greatly improves cleaning effect. The materials after being hot washed by the multi-axis variable-speed hot washing machine are transported to the dehydration assembly for dehydration, so as to implement separation of cleaning water and the materials. The multi-axis variable-speed hot washing module reduces investment in devices and land occupation, and simultaneously improves efficiency of hot washing. The entire process is rationalized, compacted, and simplified, and has great economic promotion value.

2. After being pre-mixed with the medicinal water, the materials are added to the multi-axis variable-speed hot washing machine for hot washing. After the hot washing is completed, the materials are sent to the water shower machine for preliminary dehydration, and finally sent to the dehydrator for dehydration. The specially designed multi-axis variable-speed hot washing machine is used to replace a traditional hot washing machine, a feeding screw conveyor, and a friction machine. One device completes functions of three traditional devices. The multi-axis variable-speed hot washing machine relies on its own characteristic of multi-axis variable-speed rotation, and a scraping mechanism is arranged inside the cleaning cavity, which greatly improves a friction strength of the materials during cleaning, thereby improving the cleaning effect.

3. The multi-axis variable-speed hot washing machine uses a design of a plurality of cleaning blade shafts, which greatly reduces a workload of the cleaning blade shafts compared with a design of a traditional single cleaning blade shaft, and simultaneously reduces requirements of a structural size and a strength of the cleaning blade shafts. In this way, a high-speed cleaning function that cannot be implemented by a traditional hot washing machine is implemented.

The cleaning blade shaft is simultaneously designed to be adjustable in speed. When the materials start to be cleaned, the cleaning blade shaft operates at a low speed, so that the materials are fully mixed with high-temperature cleaning liquid, to achieve the objective of preheating the materials and pre-cleaning. Then, the cleaning blade shaft is switched to high-speed cleaning. The materials are driven by the cleaning blade shaft at a high speed in the cleaning cavity, to implement strong cleaning on the materials between cleaning blade shaft layers, between the cleaning blade shafts, and between the cleaning blade shaft and the inner wall of the cleaning cavity. In addition, due to the design of a plurality of cleaning blade shafts, the materials may change a cleaning track between the cleaning blade shafts during cleaning, thereby avoiding generation of material cleaning dead ends, and may generate stronger cleaning capabilities without dead ends compared with a traditional hot washing design.

DETAILED DESCRIPTION

Figure 1:
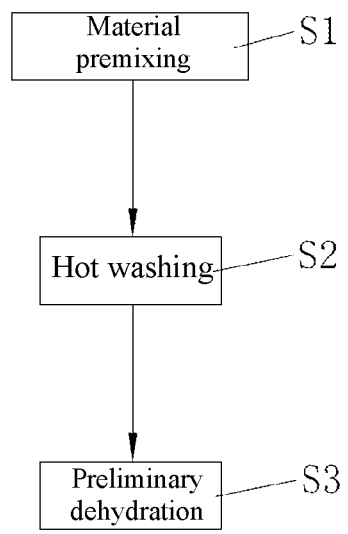
FIG. 1 is a simplified schematic flowchart of a hot washing method according to the present invention.
Figure 2:
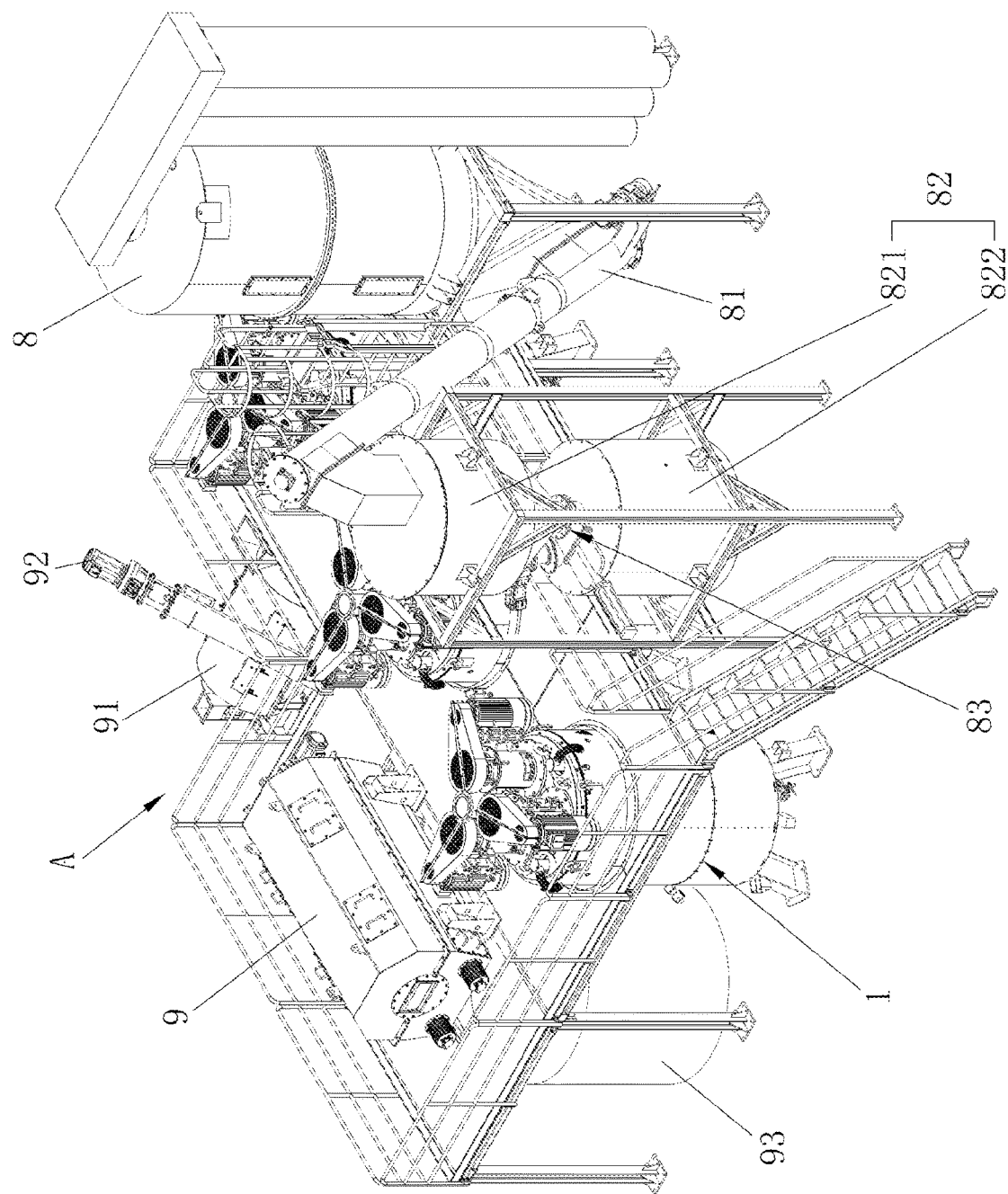
FIG. 2 is a schematic diagram of an overall structure according to the present invention.
Figure 3:
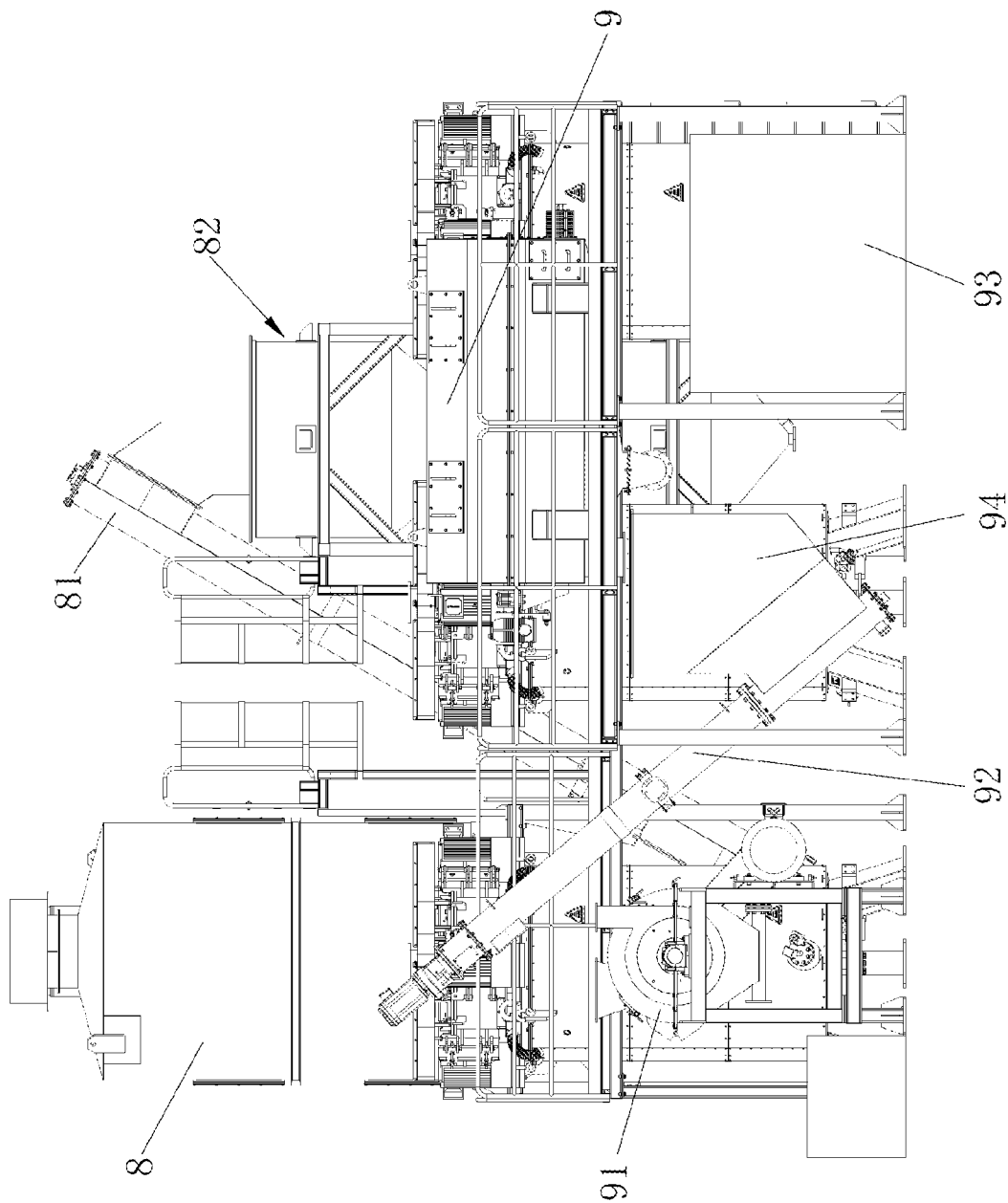
FIG. 3 is a front view long a direction A in FIG. 2.
Figure 4:
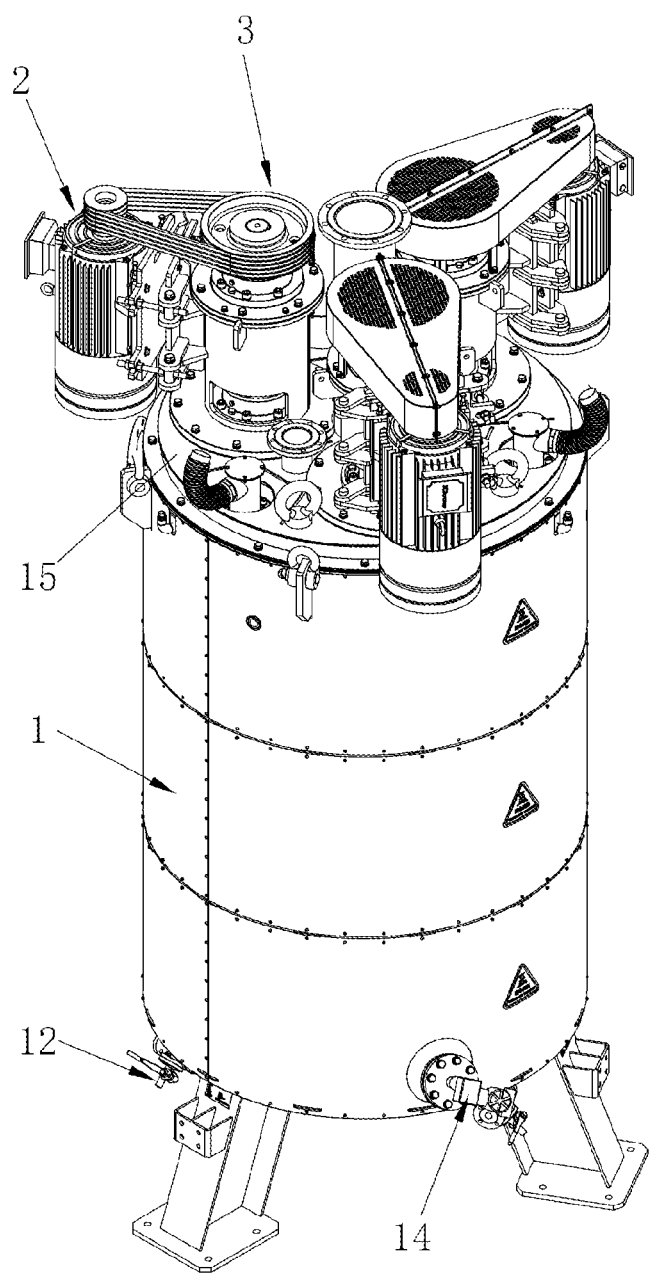
FIG. 4 is a schematic diagram of an overall structure of a multi-axis variable-speed hot washing machine according to the present invention.
Figure 5:
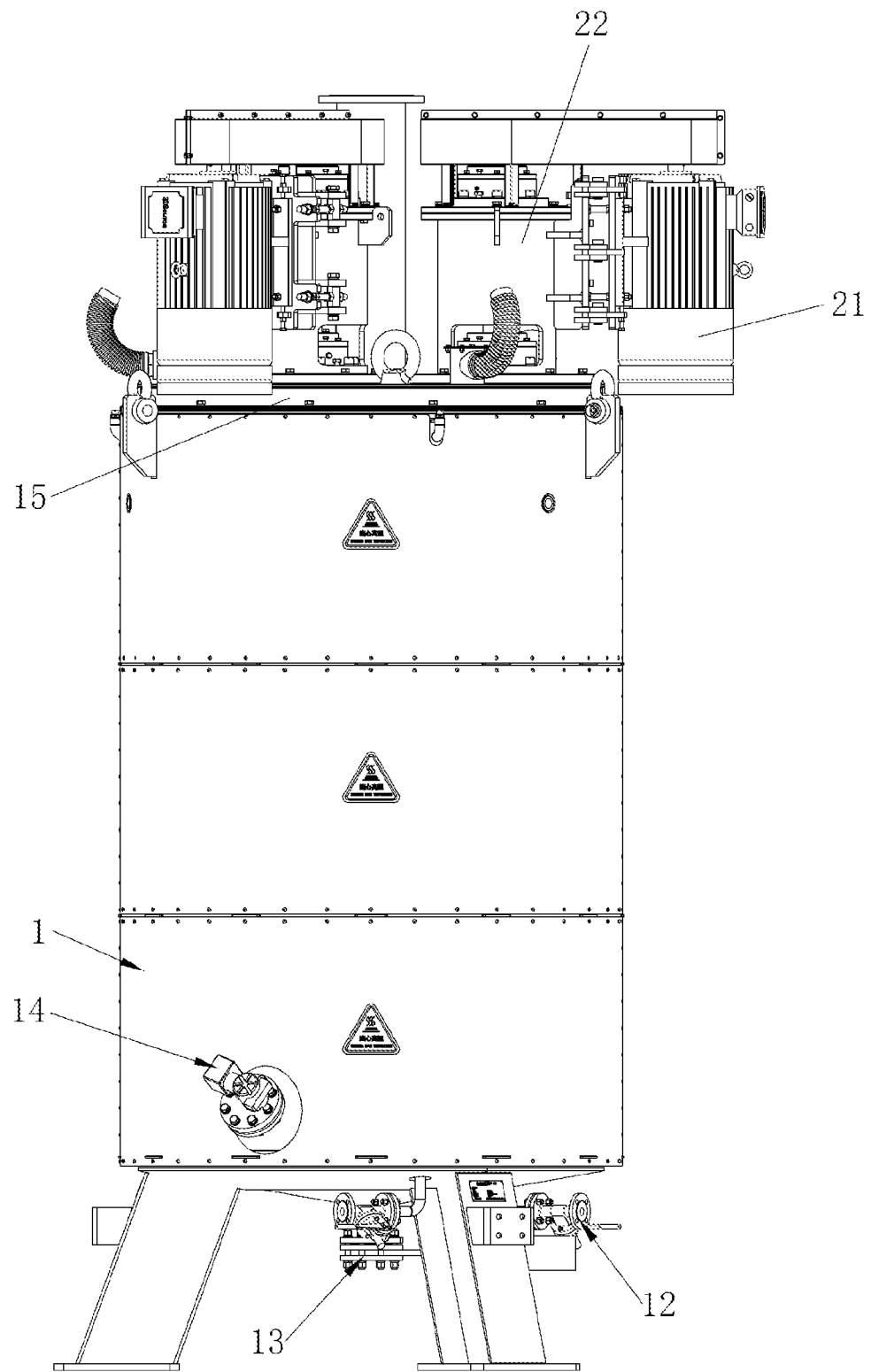
FIG. 5 is a front view showing a multi-axis variable-speed hot washing machine according to the present invention.
Figure 6:
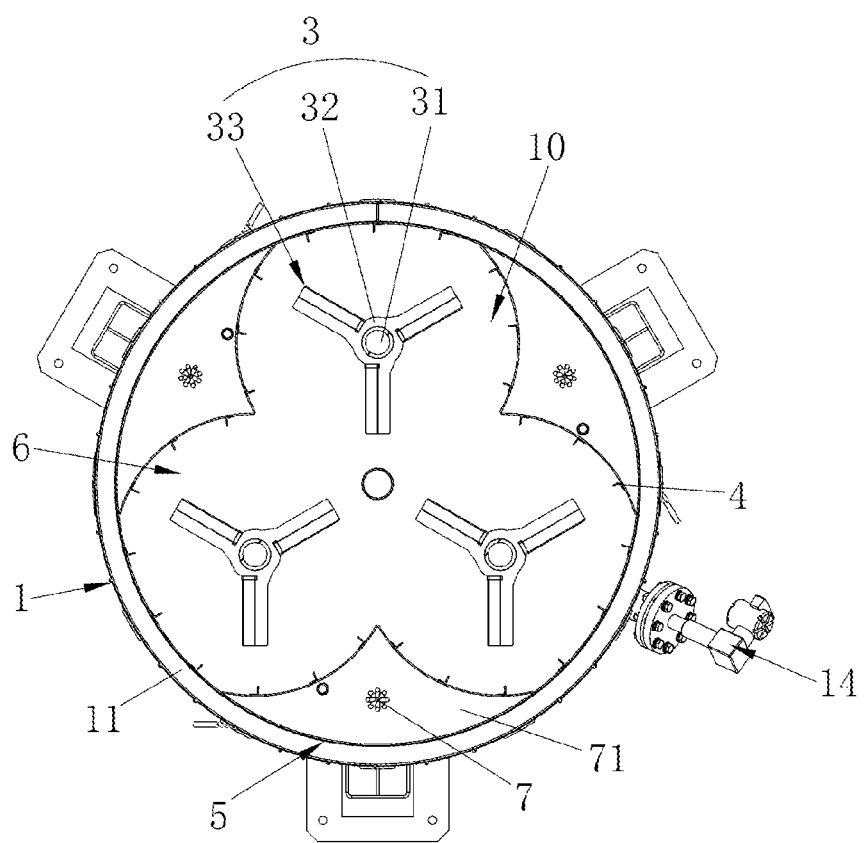
FIG. 6 is a top view (a cover plate is omitted) showing a multi-axis variable-speed hot washing machine according to the present invention.
Figure 7:
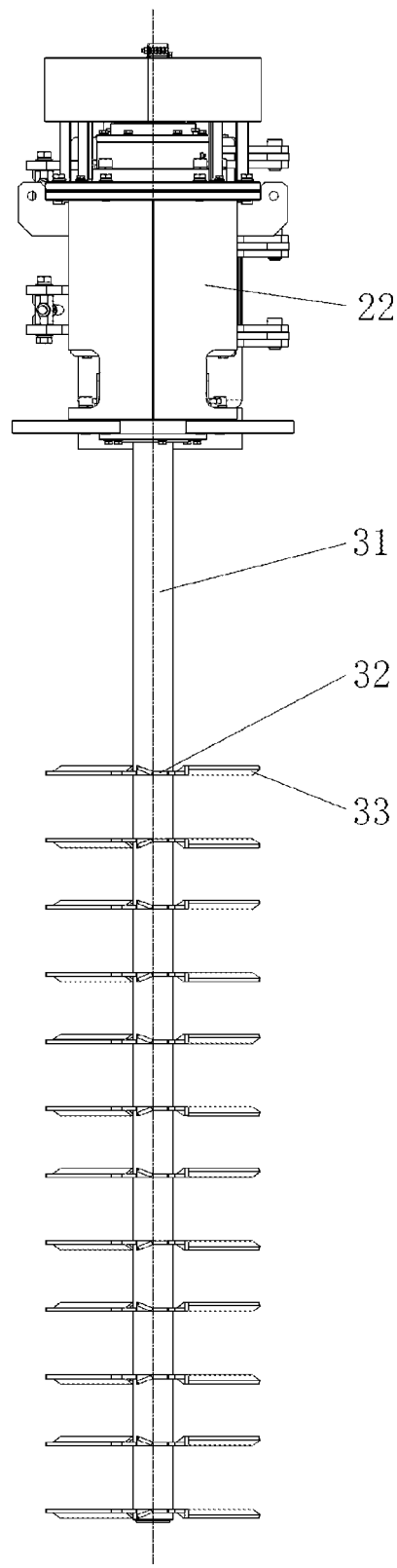
FIG. 7 is a front view showing a cleaning blade shaft according to the present invention.
Figure 8:
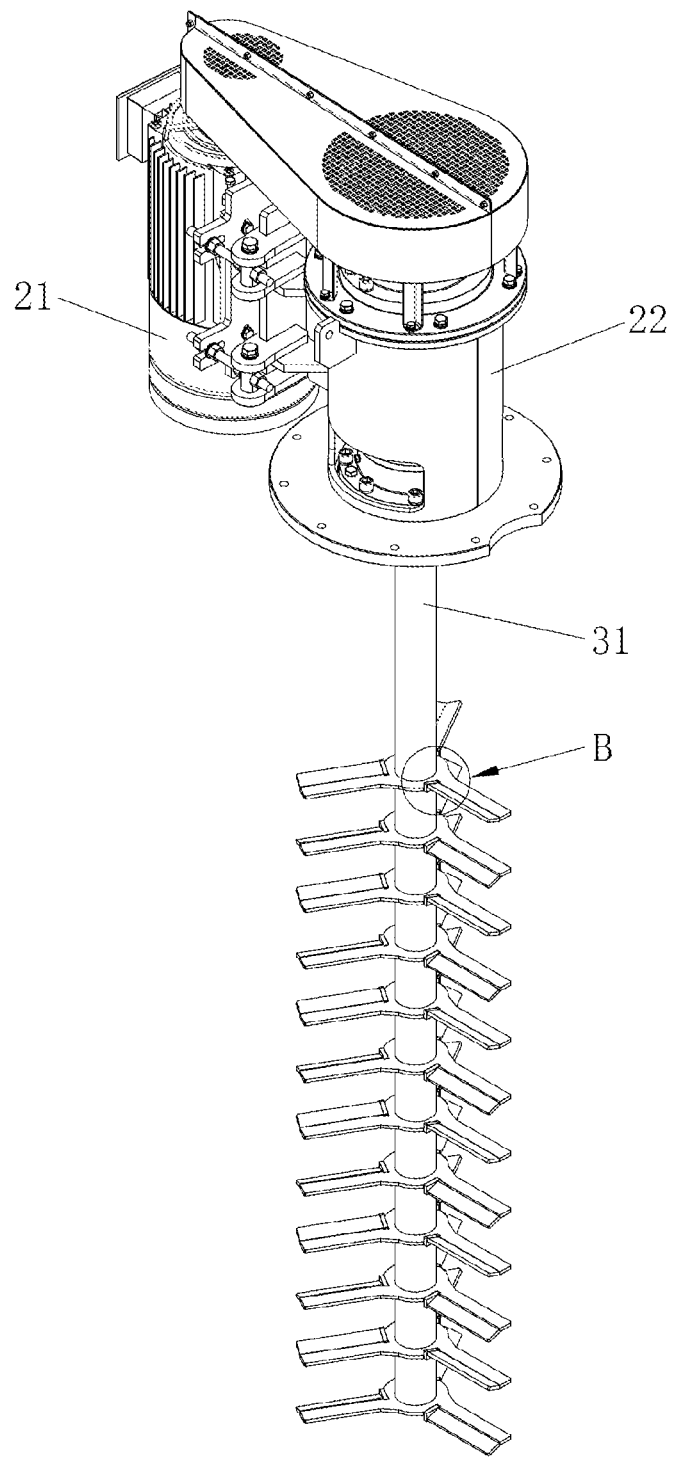
FIG. 8 is a schematic structural diagram of a cleaning blade shaft according to the present invention.
Figure 9:
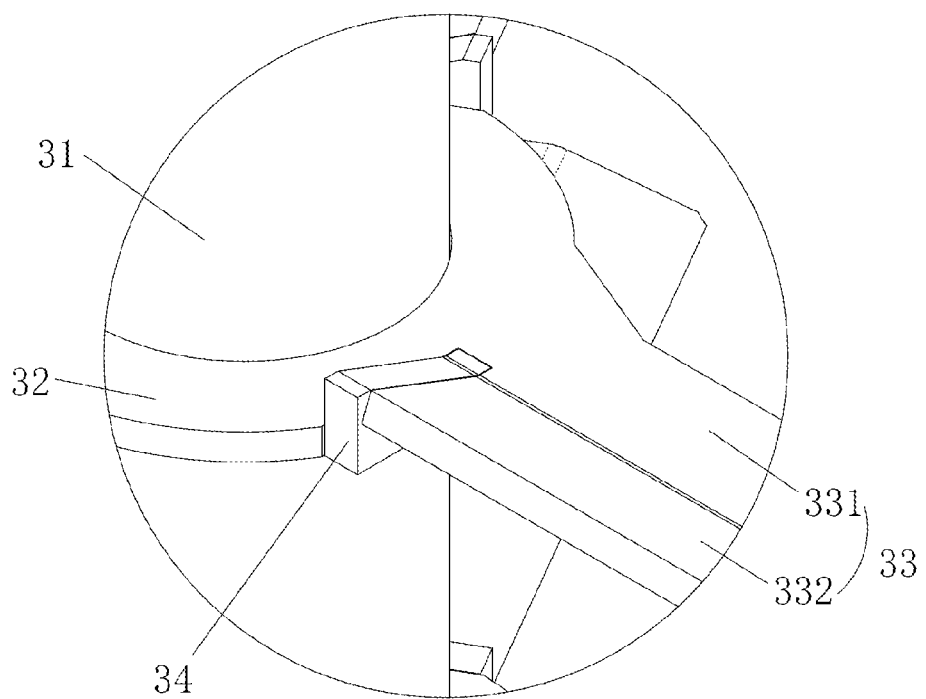
FIG. 9 is an enlarged schematic diagram of a part B in FIG. 8.

The following disclosed content provides a plurality of implementations or illustrations, which may be used to implement different features of the disclosed content. Specific examples of assemblies and arrangements are described below to simplify the present disclosed content. It is obvious that these descriptions are only examples, and are not intended to limit the present disclosed content. For example, in the description below, forming a first feature on or over a second feature may include some embodiments in which the first feature and second feature are in direct contact with each other; and it is also possible to include some embodiments in which additional assemblies are formed between the first feature and second feature described above, so that the first feature and second feature may not be in direct contact with each other. In addition, the present disclosed content may reuse assembly symbols and/or labels in various embodiments. The reuse is for the objective of simplification and clarity, and does not represent a relationship between the described various embodiments and/or configurations.

Furthermore, the use of spatially relative terms such as "under", "below", "lower", "above", "over" and the like may be for the convenience of explaining a relationship between one assembly or feature shown relative to another or more assemblies or features. These spatially relative terms are intended to cover a plurality of different orientations of the apparatus during use or operation in addition to the orientation depicted in the drawings. The device may be positioned in other orientations (for example, rotated 90 degrees or in other orientations), and these spatially relative descriptors should be interpreted accordingly.

Although numerical ranges and parameters setting forth a relatively broad scope of this application are approximations, relative numerical values set forth in specific embodiments are presented herein as precisely as possible. However, any numerical value inherently includes standard deviations resulting from their individual testing method. "About" generally refers to that an actual value is in plus or minus 10%, 5%, 1%, or 0.5% of a specified value or range. Alternatively, the term "about" refers to that an actual value falls within an acceptable standard error of the mean, as considered by a person of ordinary skill in the art to which this application belongs. It should be understood that except for experimental examples, or unless otherwise clearly stated, all ranges, quantities, numerical values, and percentages used herein (for example, to describe an amount of materials used, a length of time, temperature, an operating condition, a quantity ratio, and other similar) are modified by "about". Therefore, unless otherwise stated to the contrary, numerical parameters disclosed in this specification and appended patent claims are approximate values and may be changed as required. At least these numerical parameters should be understood as a value obtained by applying a normal rounding method to indicated effective digits. Numerical ranges are represented herein as being from one endpoint to the other or between two endpoints; and unless otherwise stated, the numerical ranges all include endpoints.

The following further describes the present invention in detail with reference to the accompanying drawings.

Embodiment 1

FIG. 1 is a multi-axis variable-speed hot washing module disclosed by the present invention, including a storage assembly and a dehydration assembly, and characterized in that one or more multi-axis variable-speed hot washing machines 1 are further included, where the multi-axis variable-speed hot washing machine 1 is connected to the storage assembly and the dehydration assembly.

The multi-axis variable-speed hot washing machine 1 includes a cleaning cavity 10, a variable-speed drive apparatus 2, and a rotation mechanism 3, the rotation mechanism 3 is arranged in an inner cavity of the cleaning cavity 10 and is in transmission connection with the variable-speed drive apparatus 2, at least two or more groups of rotation mechanisms 3 are arranged, and the variable-speed drive apparatus 2 is configured to adjust a rotation speed of the rotation mechanism 3.

Two or more groups of rotation mechanisms 3 are rotated at variable speeds in the cleaning cavity 10 through the variable-speed drive apparatus 2. Compared with a defect of the traditional hot washing machine, which is a cylinder with a smooth inner wall and a single cleaning blade shaft 31 is arranged in the inner cavity, the rotation mechanisms 3 greatly increase mechanical friction of the materials during cleaning. In addition, a plurality of groups of rotation mechanisms 3 may rotate at variable speeds. When rotating at a low speed, it helps the materials to be fully mixed with the medicinal water. When the rotation mechanisms 3 rotate at a high speed, labels and impurities on the materials may be effectively stripped, improving the cleaning effect.

A plug valve 13 in communication with inside of the cleaning cavity 10 is arranged at the bottom part of the cleaning cavity 10, where the plug valve 13 is configured to separate from the water pump during cleaning, so as to avoid the materials and cleaning water from entering the water pump during cleaning. The plug valve 13 is turned on after cleaning is completed, and the water pump is used to extract out bottle flakes and cleaning water together. In this embodiment, the plug valve 13 is detachably fixed on the bottom part of the cleaning cavity 10 by bolts and flanges. The materials are discharged from the bottom part of the cleaning cavity 10 through the water pump, which avoids loss of the medicinal water and the materials, improves a recovery rate of the bottle flakes, and reduces a cost of the devices and a cost of space.

An intelligent differential pressure transmitter 14 is mounted on the outer wall of the cleaning cavity 10. The intelligent differential pressure transmitter 14 may be configured to control a liquid level in the cleaning cavity 10. In this embodiment, the intelligent differential pressure transmitter 14 is connected to the outer wall of the cleaning cavity 10 by bolts and flanges.

The top part of the cleaning cavity 10 is detachably and fixedly connected to a cover plate 15, and the variable-speed drive apparatus 2 is mounted on a surface of the cover plate 15 away from the cleaning cavity 10. In this embodiment, the cover plate 15 is connected to the cleaning cavity 10 by bolts, which is convenient for disassembling and assembling and maintenance of the machine. The variable-speed drive apparatus 2 is mounted on the cover plate 15, and may stably provide power for the cleaning blade shaft 31, which improves the practicability.

The variable-speed drive apparatus 2 includes a motor and a bearing seat assembly 22, the motor is in transmission connection with the bearing seat assembly 22 through a belt, and the bearing seat assembly 22 is in transmission connection with the cleaning blade shaft 31. Transmission of a motor of the variable-speed drive apparatus 2 drives rotation of the bearing seat assembly 22, and transmission of the bearing seat assembly 22 drives rotation of the cleaning blade shaft 31, so that the materials may be stirred and cleaned at a high strength in the cleaning cavity 10, which may not only effectively remove dirt and impurities from the bottle flakes, and simultaneously strip labels and adhesives from the bottle flakes.

In this embodiment, the motor is configured as a variable frequency motor 21. The arrangement of the variable frequency motor 21 enables adjustment of the cleaning blade shaft 31 to be variable in speed, so as to adapt to different quantities of materials. One the basis of ensuring the cleaning effect of the materials, service life of the motor is enhanced.

A scraping mechanism configured to enhance a cleaning effect of squeeze and friction with cleaning materials is arranged on an inner wall of the cleaning cavity 10. Further, the scraping mechanism includes a plurality of protrusions fixed on the inner wall of the cleaning cavity 10.

In this embodiment, the protrusions are arranged as scrapers 4, the scrapers 4 are evenly fixed on the inner wall of the cleaning cavity 10, and a cross-sectional area of the scrapers 4 is in a shape of "L". In addition, an upper end and a lower end of each scraper 4 extend to a top part and a bottom part of the inner wall of the cleaning cavity 10, to ensure scraping effect of the labels or adhesives. The arrangement of the scrapers 4 causes the inner wall of the cleaning cavity 10 to present a non-smooth state. On the one hand, a friction angle between the bottle flakes and the inner wall of the cleaning cavity 10 may be increased, thereby increasing the friction between the bottle flakes. On the other hand, the scrapers 4 block the materials when the device is operating, thereby increasing the friction to improve a removal rate of the labels or adhesives.

Three groups of rotation mechanisms 3 are arranged, and each group of rotation mechanisms 3 is equipped with one variable-speed drive apparatus 2. Such arrangement enables each rotation mechanism 3 to operate independently, so that it helps to select and turn on different quantities of variable-speed drive apparatuses 2 according to different conditions, so that a plurality of rotation mechanisms 3 may operate individually without interfering with each other, which improves the practicality.

Further, the rotation mechanism 3 includes a cleaning blade shaft 31 and a plurality of blades 33, the plurality of blades 33 are axially arranged on the cleaning blade shaft 31, the cleaning blade shaft 31 is in transmission connection with the variable-speed drive apparatus 2, and a connecting plate 32 is fixed between the blades 33 and the cleaning blade shafts 31.

An axis line of the cleaning blade shaft 31 is parallel to an axis line of the cleaning cavity 10. Several blades 33 are fixed on the connecting plate 32, and each blade 33 is partially arranged obliquely. Each blade 33 is integrally formed with and fixedly connected to a side wall of the connecting plate 32 extending outward, and several blades 33 are evenly distributed surrounding the connecting plate 32 along an outer circumference direction. The connecting plate 32 is fixed on the cleaning blade shaft 31 in a manner of welding, and then the blades 33 are integrally formed with and fixedly connected to the connecting plate 32, which not only increases a structural strength of the blades 33, but also facilitates manufacturing and welding. In addition, there is no gap between the connecting plate 32 and the blades 33, thereby preventing the bottle flakes from being caught in the gap between the blades 33 and the connecting plate 32. The blades 33 are evenly distributed surrounding the connecting plate 32 along an outer circumference direction, so that a centrifugal force on the outer circumference of the cleaning blade shaft 31 is the same, ensuring rotation stability of the cleaning blade shaft 31.

When cleaning the materials, the variable-speed drive apparatus 2 drives the cleaning blade shaft 31 to rotate, and the cleaning blade shaft 31 drives the blades 33 to rotate through the connecting plate 32. When two or more rotation shafts rotate in opposite directions, the connecting plate 32 drives the blades 33 to continuously rotate to generate high-speed water flow. The to-be-washed materials perform high-speed rotating movement in water through a high-speed guide action of the blades 33 of the connecting plate 32 of two adjacent rotation shafts in the high-speed water flow, the materials rub against the scraping mechanism at high temperature.

A plurality of cleaning blade shafts 31 are evenly distributed in the cavity of the cleaning cavity 10, so that the cleaning blade shafts 31 occupy as much volume as possible in the cavity, thereby limiting space in which the materials may stay in the cavity, causing a movement range of the materials during the operation of the device to be reduced and the friction therebetween is greatly increased, and improving the cleaning effect of the materials.

In addition, the blades 33 that are partially arranged obliquely may not only move the materials to cause the materials 33 to rotate, but also may cause the materials to squeeze and rub against each other when moving between the cleaning blade shafts 31. Compared with the traditional single overall inclined blade 33, the partially inclined blades 33 have a higher structural strength due to the presence of folded edges, and are not easy to break during use, which improves the service life of the blades 33.

Each of the blades 33 is arranged as a strip-shaped plate structure, each of the blades 33 includes an anti-bending plate 331 and an inclined plate 332, and the anti-bending plate 331 and the inclined plate 332 are integrally formed and are fixedly connected. The anti-bending plate 331 is horizontally arranged, and the inclined plate 332 is obliquely arranged. On the one hand, the inclined plate 332 may stir the materials to cause the materials to rotate, and simultaneously may cause the materials to squeeze and rub against each other between the blades 33 when the materials move between the cleaning blade shafts 31, which further improves the effect of scraping and washing.

A reinforcing member 34 is fixedly connected to the connecting plate 32, and one end of the inclined plate 332 close to the connecting plate 32 is fixed on the reinforcing member 34. The reinforcing member 34 improves structural stability of the inclined plate 332, making it less prone to splitting. On the same cleaning blade shaft 31, inclined directions of inclined plates 332 of any two adjacent connecting plates 32 are opposite or the same. In this embodiment, on the same cleaning blade shaft 31, inclined directions of inclined plates 332 of any two adjacent connecting plates 32 are opposite, so as to ensure that the materials also squeeze and rub against each other between the blades 33 when moving between the cleaning blade shafts 31, to enhance the scrubbing effect. An inclination angle of the inclined plate 332 relative to a horizontal anti-bending plate 331 is &, and $0°<\&<90°$. In this embodiment, an inclination angle of & is 21°.

A heating mechanism configured to heat the cleaning water is arranged inside the cleaning cavity 10. The heating mechanism may heat the cleaning water in the cleaning cavity 10. On the one hand, impurities and dirt on surfaces of the bottle flakes may be effectively stripped, and on the other hand, the labels or adhesives on the bottle flakes may be softened, which are easy to be stripped when scraping and cleaning, improving the cleaning effect of the bottle flakes.

A plurality of liners 5 are arranged in the inner cavity of the cleaning cavity 10, and one end of each of the liners 5 away from an inner wall of the cleaning cavity 10 offsets toward a central axis of the cleaning cavity 10. A hot washing sub-cavity 6 is formed between two adjacent liners 5, and a plurality of hot washing sub-cavities 6 are in communication with each other to form the inner cavity of the cleaning cavity 10.

The arrangement of a plurality of liners 5 improves a friction area between the inner wall of the cleaning cavity 10 and the bottle flakes on the one hand, and limits the materials in the hot washing sub-cavity 6 including the scraper 4, so that the materials, the blades 33, and a barrel body fully contact with each other, stir with each other, and rub against each other, improving the cleaning effect of the bottle flakes and causing the bottle flakes to be more clean. On the other hand, space for the materials to stay in the cavity is further reduced, so that a movement range of the materials is reduced while the device is operating, and the friction between the device and the materials is greatly increased, to ensure the strength of cleaning. In this embodiment, a design of a three-blade liner 5 is used, and tests show that the design of the three-blade liner 5 has the best cleaning effect.

A plurality of rotation mechanisms 3 are evenly distributed in respective hot washing sub-cavities 6. A rotation mechanism 3 is arranged in a hot washing sub-cavity 6, which may not only ensure stability of rotation of the rotation mechanism 3, but also improve the balance of the cleaning cavity 10.

The heating mechanism includes a plurality of heating rods 7, heat conduction oil 71 is arranged in each of the liners 5, and the heating rods 7 are mounted in the liners 5 to heat the heat conduction oil 71. The heating rod 7 is energized to heat the heat conduction oil 71 in the liner 5, and the heat conduction oil 71 conducts heat to the cleaning water in the cleaning cavity 10, to increase the temperature of the cleaning water, so as to facilitate stripping of impurities and dirt on the bottle flakes. A temperature sensor is mounted in the heating rod 7, and the temperature sensor may monitor the temperature of the heating rod 7 in real time, so that workers may adjust the power of the heating rod 7 in real time.

A plurality of cleaning blade shafts 31 are evenly distributed in the cavity of the cleaning cavity 10, a plurality of liners 5 are arranged inside the cavity, and one end of each of the liners 5 is offset along a center line of the cleaning cavity 10, so that the cleaning blade shafts 31 occupy as much volume as possible in the hot washing sub-cavity 6, thereby limiting space in which the materials may stay in the cavity, causing a movement range of the materials to be reduced during operation of the device and greatly increasing the friction therebetween, and improving the cleaning effect of the bottle flakes.

An insulating layer 11 is arranged on the outer wall of the cleaning cavity 10, and the insulating layer 11 may reduce heat loss inside the cleaning cavity 10 after the heating rod 7 heats the heat conduction oil 71, and improve the utilization of heat energy. A drain valve 12 in communication with inside of the liner 5 is arranged at a bottom part of the cleaning cavity 10, and the drain valve 12 may be configured to discharge the heat conduction oil 71 during device maintenance.

A scraper is added on the inner wall to block the materials during operation of the device to increase friction. The blades 33 of the cleaning blade shaft 31 are arranged intermittently in the same direction, that is, the orientation between adjacent blades 33 is in a shape of "^", so that the materials squeeze and rub against each other between the blades 33 when moving between the cleaning blade shafts 31. The faster the rotation speed of the cleaning blade shaft 31 is, the greater the friction on the surfaces of the bottle flakes is, and the cleaner the washed bottle flakes are. The materials are discharged from the bottom part through the water pump, thereby reducing a cost of the devices and a cost of space.

The storage assembly includes a temporary storage bin 8, a first conveying apparatus 81, and a preparatory bin 82 in communication with the temporary storage bin 8, the temporary storage bin 8 is configured to store materials, the first conveying apparatus 81 is configured to transport the materials in the temporary storage bin 8 to the preparatory bin 82, the preparatory bin 82 is configured to measure the materials and mix medicinal water and the materials, and the preparatory bin 82 is in communication with the inner cavity of the cleaning cavity 10.

First, the quantitative materials are transported to the preparatory bin 82 by the first conveying apparatus 81. On the one hand, it is convenient to measure the materials added to the corresponding multi-axis variable-speed hot washing machine 1, so that the materials added to the single multi-axis variable-speed hot washing machine 1 may improve the efficiency of batch cleaning of the materials under the premise of meeting the cleaning requirement. On the other hand, it is convenient to mix the medicinal water with the materials, so as to facilitate a subsequent hot washing process of the multi-axis variable-speed hot washing machine 1 and improve the cleaning effect.

The preparatory bin 82 includes an upper preparatory bin 821 and a lower preparatory bin 822 that are in communication with each other, a switch 83 is arranged at a joint between the upper preparatory bin 821 and the lower preparatory bin 822, and a meter configured to measure the materials is arranged in the upper preparatory bin 821. The temporary storage bin 8 is connected to the upper preparatory bin 821 through the first conveying apparatus 81, and the lower preparatory bin 822 is in communication with the inner cavity of the cleaning cavity 10 through a water pump. A stirrer is arranged in the lower preparatory bin 822, and a preheating apparatus is arranged on the lower preparatory bin 822.

In this embodiment, the switch 83 is configured as a valve. When the switch 83 is turned off, the materials are stacked in the upper preparatory bin 821, which is convenient for the meter to calculate a total weight of the materials. When the switch 83 is turned on, it is convenient to put the materials into the lower preparatory bin 822. Under stirring of the stirrer in the lower preparatory bin 822 and heating of the preheating apparatus, the materials and the medicinal water are mixed into high-temperature bottle flake mixed liquid, and then the high-temperature bottle flake mixed liquid is pumped into the inner cavity of the cleaning cavity 10 of the multi-axis variable-speed hot washing machine 1 through the water pump.

Due to intercommunication between the bottom part of the traditional hot washing machine and the feeding screw conveyor, in a hot washing process, on the one hand, some bottle flakes that are not fully cleaned enter a gap between the blades of the feeding screw conveyor and cannot be fully cleaned. After the hot washing is completed, the bottle flakes are directly sent to a friction and drying process, thereby reducing the cleaning effect of the bottle flakes. On the other hand, the high-temperature medicinal water in the hot washing machine enters the inclined feeding screw conveyor. With the rotation of the screw blades in the feeding screw conveyor, the high-temperature medicinal water is continuously transported into the friction machine and is directly discharged along with the bottle flakes. In addition, the water level in the hot washing machine keeps decreasing. In order to ensure the cleaning effect of the hot washing machine, it is necessary to pour the medicinal water into the hot washing machine many times, which is time-consuming and laborious, increasing consumption of the medicinal water and increasing the cleaning cost of enterprises. The water pump is used to pump the high-temperature bottle flake mixed liquid into the multi-axis variable-speed hot washing machine 1. After the hot washing is completed, the water pump is used to pump the mixed materials into the water shower machine 9. Compared with a traditional conveying manner of the feeding screw conveyor, using the water pump to transport the materials, on the one hand, avoids the waste of logistics, and on the other hand, avoids the loss of the medicinal water and reduces the production cost of enterprises.

The dehydration assembly includes a water shower machine 9, a dehydrator 91, and a second conveying apparatus 92, inside of the water shower machine 9 is in communication with the inner cavity of the cleaning cavity 10, the water shower machine 9 is connected to the dehydrator 91 through the second conveying apparatus 92, and the inner cavity of the cleaning cavity 10 is in communication with the inside of the water shower machine 9 through a water pump. After the hot washing is completed, the materials are put into the water shower machine 9 for preliminary dehydration, which may effectively remove most of the medicinal water. After the preliminary dehydration, the materials are transported to the dehydrator 91 by the second conveying apparatus 92 for dehydration, to remove residual water on the materials and improve the cleaning effect.

The water shower machine 9 is connected to a water groove 93 configured to collect the discharged medicinal water, and the water groove 93 may effectively collect the medicinal water generated by the water shower machine 9, which improves the practicability. The dehydrator 91 also has a small water groove, and is in communication with water groove 93 through the water pump, and the medicinal water in the small water groove may be pumped into 93.

In this embodiment, the first conveying apparatus 81 is configured as a first screw conveyor, one end of the first screw conveyor is connected to a bottom part of the temporary storage bin 8, and the other end of the first screw conveyor is connected to a top part of the preparatory bin 82. When the first screw conveyor is turned on, a propeller inside the first screw conveyor rotates, and the materials are transported from the temporary storage bin 8 to the preparatory bin 82 in a screw conveying manner, which does not require manual operation and has a high degree of automation.

The second conveying apparatus 92 is configured as a second screw conveyor, one end of the second screw conveyor is connected to a buffer bin 94, the other end of the second screw conveyor is in communication with inside of the dehydrator 91, and the buffer bin 94 is arranged at a bottom part of a discharge port of the water shower machine 9. The materials after the preliminary dehydration by the water shower machine 9 fall into the buffer bin 94, and the propeller inside the second screw conveyor rotates. The materials after the preliminary dehydration are transported to the dehydrator 91 in a screw conveying manner, and the materials enter a next process after dehydration and drying by the dehydrator 91.

A hot washing method based on a multi-axis variable-speed hot washing module includes the following steps:

S1: material premixing, where dry materials are put from a temporary storage bin 8 into a preparatory bin 82, and heated medicinal water is added into the preparatory bin 82 to form high-temperature material mixed liquid;

S2: hot washing, where after the materials are fully mixed with the medicinal water, the high-temperature material mixed liquid is pumped into a multi-axis variable-speed hot washing machine 1 through a water pump, and the multi-axis variable-speed hot washing machine 1 performs timing low-speed soaking washing and timing high-speed friction washing on the materials; and S3: dehydration, where after the hot washing is completed, material mixed liquid in the multi-axis variable-speed hot washing machine 1 is quickly pumped into a water shower machine 9 through the water pump, the materials after preliminary dehydration by the water shower machine 9 are sent into a buffer bin 94 with a screw, the materials are sent into a dehydrator 91 through screwing for dehydration, and a next process is entered after drying.

Step S1 further includes the following substeps:

S1a: putting the dry materials from the temporary storage bin 8 into an upper preparatory bin 821 through screw conveying, and measuring a weight of added materials through a meter;

S1b: turning on a switch 83 at a joint between the upper preparatory bin 821 and a lower preparatory bin 822, pouring the materials into the lower preparatory bin 822, and simultaneously pumping the heated medicinal water into the lower preparatory bin 822 through the water pump;

S1c: turning on a stirrer and a preheating apparatus, and mixing the materials and the medicinal water into the high-temperature material mixed liquid under stirring of the stirrer in the lower preparatory bin 822 and heating of the preheating apparatus; and S1d: after the materials and the medicinal water are fully mixed, turning on a valve at a bottom part of the lower preparatory bin 822, and pumping the high-temperature material mixed liquid into the multi-axis variable-speed hot washing machine 1 through the water pump.

The upper preparatory bin 821 and the lower preparatory bin 822 simultaneously prepare a next batch of material mixed liquid, and sequentially pump the next batch of material mixed liquid into a next multi-axis variable-speed hot washing machine 1. Such arrangement may cause the hot washing module to operate continuously, thereby improving the operating efficiency of the hot washing module.

In step S2:

the step of timing low-speed soaking washing includes: adjusting a variable-speed drive apparatus 2 of the multi-axis variable-speed hot washing machine 1, so that the variable-speed drive apparatus 2 drives a plurality of cleaning blade shafts 31 to perform low-speed pre-soaking washing for 30 to 40 min at a rotation speed of 70 to 100 r/min. The step of timing high-speed friction washing includes: adjusting the variable-speed drive apparatus 2 of the multi-axis variable-speed hot washing machine 1 again, so that the rotation speed of the plurality of cleaning blade shafts 31 is increased to 800 to 1000 r/min to perform high-speed cleaning, which lasts for 30 to 40 min.

Because a design of a plurality of cleaning blade shafts 31 is used, which greatly reduces a workload of the cleaning blade shafts 31 compared with a design of a traditional single cleaning blade shaft 31, and simultaneously reduces requirements of a structural size and a strength of the cleaning blade shafts 31. In this way, a high-speed cleaning function that cannot be implemented by a traditional hot washing machine is implemented.

An amount of the high-temperature material mixed liquid prepared by the upper preparatory bin 821 and the lower preparatory bin 822 once is an amount used for a single multi-axis variable-speed hot washing machine 1 to perform cleaning once.

In step S3, the medicinal water discharged from the water shower machine 9 and the dehydrator 91 is collected into a corresponding water groove 93, and recycled after treatment. The medicinal water discharged from the water shower machine 9 and the dehydrator 91 is collected in the water groove 93, which is convenient for subsequent recycling, saves water resources, reduces the production cost of enterprises, and meets a requirement of modern environmental protection.

The cleaning blade shaft 31 of the multi-axis variable-speed hot washing machine 1 is designed to be adjustable in speed. When the materials start to be cleaned, the cleaning blade shaft runs at a low speed, so that the materials are fully mixed with high-temperature cleaning liquid to achieve the objective of preheating the materials and pre-cleaning. Then, the cleaning blade shaft 31 is switched to high-speed cleaning. The materials are driven by the cleaning blade shaft 31 at a high speed in the cleaning cavity 10, to implement strong cleaning of the materials between cleaning blade shaft 31 layers, between the cleaning blade shafts 31, and between the cleaning blade shaft 31 and the inner wall of the cleaning cavity 10. In addition, due to the design of a plurality of cleaning blade shafts 31, the materials may change a cleaning track between the cleaning blade shafts 31 during cleaning, thereby avoiding generation of material cleaning dead angle, and may generate stronger cleaning capabilities without dead ends compared with a traditional hot washing design.

Embodiment 2

A difference between a multi-axis variable-speed hot washing module and Embodiment 1 lies in that three groups of rotation mechanisms 3 are arranged, and the three groups of rotation mechanisms 3 share one variable-speed drive apparatus 2. The three groups of rotation mechanisms 3 share one variable-speed drive apparatus 2, so that the three groups of rotation mechanisms 3 may operate synchronously.

Embodiment 3

A difference between a hot washing method for a multi-axis variable-speed hot washing module and Embodiment 1 lies in that in step S2:
the step of timing low-speed soaking washing includes: adjusting a variable-speed drive apparatus 2 of the multi-axis variable-speed hot washing machine 1, so that the variable-speed drive apparatus 2 drives a plurality of cleaning blade shafts 31 to perform low-speed pre-soaking washing for 30 min at a rotation speed of 70 r/min. The step of timing high-speed friction washing includes: adjusting the variable-speed drive apparatus 2 of the multi-axis variable-speed hot washing machine 1 again, so that the rotation speed of the plurality of cleaning blade shafts 31 is increased to 800 r/min to perform high-speed cleaning, which lasts for 30 min.

Embodiment 4

A difference between a hot washing method for a multi-axis variable-speed hot washing module and Embodiment 1 lies in that in step S2:
the step of timing low-speed soaking washing includes: adjusting a variable-speed drive apparatus 2 of the multi-axis variable-speed hot washing machine 1, so that the variable-speed drive apparatus 2 drives a plurality of cleaning blade shafts 31 to perform low-speed pre-soaking washing for 35 min at a rotation speed of 80 r/min. The step of timing high-speed friction washing includes: adjusting the variable-speed drive apparatus 2 of the multi-axis variable-speed hot washing machine 1 again, so that the rotation speed of the plurality of cleaning blade shafts 31 is increased to 900 r/min to perform high-speed cleaning, which lasts for 35 min.

Embodiment 5

A difference between a hot washing method for a multi-axis variable-speed hot washing module and Embodiment 1 lies in that
In step S2:
the step of timing low-speed soaking washing includes: adjusting a variable-speed drive apparatus 2 of the multi-axis variable-speed hot washing machine 1, so that the variable-speed drive apparatus 2 drives a plurality of cleaning blade shafts 31 to perform low-speed pre-soaking washing for 40 min at a rotation speed of 100 r/min. The step of timing high-speed friction washing includes: adjusting the variable-speed drive apparatus 2 of the multi-axis variable-speed hot washing machine 1 again, so that the rotation speed of the plurality of cleaning blade shafts 31 is increased to 1000 r/min to perform high-speed cleaning, which lasts for 40 min.

The materials after the hot washing process in the related art is subjected to a back pressure test. Under the condition of an 80/400/80 mesh filter screen, a throughput of the materials is about 3 to 6 kg.

The multi-axis variable-speed hot washing module and a cleaning method thereof in Embodiment 4 of the present invention is used, the back pressure test is performed on the cleaned materials. Under the condition of the 80/400/80 mesh filter, the throughput of the materials is about 7.7 kg.

The higher the throughput of the materials, the cleaner the materials are cleaned. From this point of view, Embodiment 4 is the best embodiment of the present invention.

An implementation principle of the present invention is: batches of materials are stored in the storage assembly. When cleaning, the materials are put from the storage assembly into one or more multi-axis variable-speed hot washing machines 1, and medicinal water is added. The multi-axis variable-speed hot washing machine 1 replaces a function of a hot washing machine, a screw machine, and a friction machine, and has a relatively large mechanical friction on the materials during cleaning, which greatly improves cleaning effect. The materials after being hot washed by the multi-axis variable-speed hot washing machine 1 are transported to the dehydration assembly for dehydration, so as to implement separation between cleaning water and the materials. This multi-axis variable-speed hot washing module reduces the investment in devices and land occupation, and simultaneously improves the efficiency of hot washing.

After being pre-mixed with the medicinal water, the materials are added to the multi-axis variable-speed hot washing machine 1 for hot washing. After the hot washing is completed, the materials are sent to the water shower machine 9 for preliminary dehydration, and are finally sent to the dehydrator 91 for dehydration. The specially designed multi-axis variable-speed hot washing machine 1 is configured to replace a traditional hot washing machine, a feeding screw conveyor, and a friction machine. One device completes functions of three traditional devices. The multi-axis variable-speed hot washing machine 1 relies on its own characteristic of variable-speed rotation, and a scraping mechanism is arranged in the cleaning cavity 10, which greatly improves a friction strength of the materials during cleaning, thereby improving the cleaning effect. Moreover, the traditional hot washing process is simplified, and the entire technological process is rationalized, compacted, and simplified, and has strong economic promotion value.

The foregoing summarizes features of several embodiments, so that a person skilled in the art may better understand aspects of this application. A person skilled in the art should understand that he can readily use this application as a basis for designing or modifying other processes and structures for carrying out the same objectives and/or implementing the same advantages of the embodiments introduced herein. A person skilled in the art should further realize that such equivalent constructions do not depart from the spirit and scope of the present disclosure, and that he may make various changes, substitutions, and alterations herein without departing from the spirit and scope of the present disclosure.

Furthermore, the scope of this application is not intended to be limited to the particular embodiments of the process, machine, manufacture, composition of matter, means, methods, and steps described in this specification. A person skilled in the art readily understands, according to the disclosed content of the present disclosure, that presently existing or later developed processes, machines, manufacture, compositions of matter, means, methods, or steps, that perform substantially the same function or implement substantially the same results as the corresponding embodiments described herein may be used according to the present disclosure. Accordingly, the appended claims are intended to include these processes, machines, manufacture, compositions of matter, means, methods, or steps in their scope.

We claim:

1. A multi-axis variable-speed hot washing module, comprising a storage assembly and a dehydration assembly, and further comprising one or more multi-axis variable-speed hot washing machines, wherein the multi-axis variable-speed hot washing machine is separately connected to the storage assembly and the dehydration assembly;

wherein the multi-axis variable-speed hot washing machine comprises a cleaning cavity, a variable-speed drive apparatus, and at least two or more groups of rotation mechanisms, the at least two or more groups of rotation mechanisms are arranged in an inner cavity of the cleaning cavity and are in transmission connection with the variable-speed drive apparatus, and the variable-speed drive apparatus is configured to adjust a rotation speed of the at least two or more groups of the rotation mechanism;

wherein a plurality of inner tanks are arranged in the inner cavity of the cleaning cavity, one end of each of the inner tanks away from an inner side wall of the cleaning cavity offsets toward a central axis of the cleaning cavity, and the plurality of inner tanks are free from contacting each other; and a hot washing sub-cavity is formed between two adjacent inner tanks, and a plurality of hot washing sub-cavities are in communication with each other to form the inner cavity of the cleaning cavity, and each of the at least two or more groups of rotation mechanisms is set in a corresponding hot washing sub-cavity and parallel with the central axis of the cleaning cavity.

2. The multi-axis variable-speed hot washing module of claim 1, wherein a scraping mechanism is arranged on an inner wall of the cleaning cavity.

3. The multi-axis variable-speed hot washing module of claim 2, wherein the scraping mechanism comprises a plurality of protrusions fixed on the inner wall of the cleaning cavity.

4. The multi-axis variable-speed hot washing module of claim 1, wherein three groups of rotation mechanisms are arranged, and each group of rotation mechanisms is equipped with one variable-speed drive apparatus or three groups of rotation mechanisms are arranged, and the three groups of rotation mechanisms share one variable-speed drive apparatus.

5. The multi-axis variable-speed hot washing module of claim 1, wherein the rotation mechanism comprises a cleaning blade shaft and a plurality of blades, the plurality of blades are axially arranged on the cleaning blade shaft, and the cleaning blade shaft is in transmission connection with the variable-speed drive apparatus.

6. The multi-axis variable-speed hot washing module of claim 5, wherein a connecting plate is fixed between each of the blades and the cleaning blade shaft.

7. The multi-axis variable-speed hot washing module of claim 6, wherein the blades are arranged as strip-shaped plate structures, each of the blades comprises an anti-bending plate and an inclined plate, and the anti-bending plate and the inclined plate are integrally formed and are fixedly connected; and the anti-bending plate is horizontally arranged, and the inclined plate is obliquely arranged.

8. The multi-axis variable-speed hot washing module of claim 7, wherein a reinforcing member is fixedly connected to the connecting plate, and one end of the inclined plate close to the connecting plate is fixed on the reinforcing member.

9. The multi-axis variable-speed hot washing module of claim 1, wherein a heating mechanism configured to heat cleaning water is arranged inside the cleaning cavity.

10. The multi-axis variable-speed hot washing module of claim 1, wherein the heating mechanism comprises a plurality of heating rods, heat conduction oil is arranged in each of the inner tanks, and the heating rods are mounted in the inner tanks to heat the heat conduction oil.

11. The multi-axis variable-speed hot washing module of claim 1, wherein the storage assembly comprises a temporary storage bin, a first conveying apparatus, and a preparatory bin in communication with the temporary storage bin, the temporary storage bin is configured to store materials, the first conveying apparatus is configured to transport the materials in the temporary storage bin to the preparatory bin, the preparatory bin is configured to measure the materials and mix medicinal water and the materials, and the preparatory bin is in communication with the inner cavity of the cleaning cavity.

12. The multi-axis variable-speed hot washing module of claim 11, wherein the preparatory bin comprises an upper preparatory bin and a lower preparatory bin that are in communication with each other, a switch is arranged at a joint between the upper preparatory bin and the lower preparatory bin, and a meter configured to measure the materials is arranged in the upper preparatory bin; and the temporary storage bin is connected to the upper preparatory bin through the first conveying apparatus, and the lower preparatory bin is in communication with the inner cavity of the cleaning cavity through a water pump.

13. The multi-axis variable-speed hot washing module of claim 12, wherein a stirrer is arranged in the lower preparatory bin, and a preheating apparatus is arranged on the lower preparatory bin.

14. The multi-axis variable-speed hot washing module of claim 1, wherein the dehydration assembly comprises a water shower machine, a dehydrator, and a second conveying apparatus, inside of the water shower machine is in communication with the inner cavity of the cleaning cavity, the water shower machine is connected to the dehydrator through the second conveying apparatus, and the inner cavity of the cleaning cavity is in communication with the inside of the water shower machine through a water pump.

\* \* \* \* \*